United States Patent [19]
Lukasczyk et al.

[11] Patent Number: 5,291,915
[45] Date of Patent: Mar. 8, 1994

[54] ADJUSTABLE PRESSURE RELIEF VALVE

[75] Inventors: Wolfgang Lukasczyk, Lohr/Main; Norberto Thiesing, Frammersbach, both of Fed. Rep. of Germany

[73] Assignee: Mannesmann Rexroth GmbH, Lohr/Main, Fed. Rep. of Germany

[21] Appl. No.: 864,356

[22] Filed: Apr. 6, 1992

[30] Foreign Application Priority Data

Apr. 4, 1991 [DE] Fed. Rep. of Germany ....... 4110926

[51] Int. Cl.$^5$ .......................................... F15B 13/044
[52] U.S. Cl. ...................................... 137/82; 137/269
[58] Field of Search ................................ 137/82, 269

[56] References Cited

U.S. PATENT DOCUMENTS

| | | | |
|---|---|---|---|
| 4,193,425 | 3/1980 | de la Bouillerie | 137/625.64 X |
| 4,194,719 | 3/1980 | Ewald et al. | 137/625.64 X |
| 4,281,682 | 8/1981 | Satoh | 137/596.17 |
| 4,527,772 | 7/1985 | Kebede et al. | 137/82 X |
| 4,860,792 | 8/1989 | Ichihashi et al. | 137/596.17 |

FOREIGN PATENT DOCUMENTS

| | | |
|---|---|---|
| 3227656 | 1/1984 | Fed. Rep. of Germany . |
| 3605980 | 10/1986 | Fed. Rep. of Germany . |
| 3732175 | 4/1989 | Fed. Rep. of Germany . |
| 3829686 | 3/1990 | Fed. Rep. of Germany . |

*Primary Examiner*—Gerald A. Michalsky
*Attorney, Agent, or Firm*—Oblon, Spivak, McClelland, Maier & Neustadt

[57] ABSTRACT

A pressure relief valve system is provided that makes it possible to provide numerous varied pressure relief functions with a minimum of structural changes. For this purpose, a standard distributing valve housing is equipped with a valve core that makes it possible to construct a double-acting pressure relief valve with an individually adjustable pressure system on each valve side. However, there is also the possibility of completely shutting off the pressure system on one side. The valve core and/or the valve elements are preferably exchangeable, and the valve elements can be separately controlled by an adjusting device, for example in the form of a proportional magnet, to generate a pressure output signal corresponding to an input signal in each of the independent pressure systems independent of one another.

34 Claims, 5 Drawing Sheets

ADJUSTABLE PRESSURE RELIEF VALVE

BACKGROUND OF THE INVENTION

1. Field of the Invention

The invention relates to an adjustable pressure relief valve or to an adjustable pressure relief valve system for generating a pressure output signal corresponding to a certain input value or signal in the valve connection area.

2. Discussion of the Background

Such pressure relief valves are known in various designs and, among other things, direct control or adjustment by precontrol can be performed. Pressure relief valves are also controlled by so-called proportional magnets, i.e., by a controllable direct voltage magnet that usually works in oil and converts an electrical signal into a proportional force that acts on the valve element of the pressure relief valve. With this type of action, a pressure relief valve with good adaptability is successfully incorporated in hydraulic control loops, and use is made of the advantage that the adjusted magnetic force remains constant over the entire control range.

However, the disadvantage of these previous attempts is that the pressure relief valves in question often had to be individually designed and constructed for different applications, and then a relatively expensive structural design was necessary. This design, matched individually to the application, results in a very limited flexibility with respect to the application possibilities of such valves in hydraulic systems of the most varied functions and requirements. Consequently, also the quantities of these valves remained limited each time. It is true that it was attempted to combine details of different basic pressure valve designs to make the production process more economical. But in known designs, this integration of the individual parts into other functional groups was able to be performed only at great expense in some cases.

SUMMARY OF THE INVENTION

Thus the object of the invention is to provide an adjustable pressure relief valve system with which the utmost flexibility is made available, at low production costs, with respect to various structural designs and pressure functions.

This object is achieved by the features claimed.

According to the invention, the pressure relief valve is made so that, in the most varied designs, it has the same commercially available housing that is produced in large quantities and that can be equipped, to provide various functional properties, with interchangeable, easily produced and assembled valve cores. Thus a design is provided that, with the simplest construction and with a very small expense for parts, opens numerous possibilities for the attainable pressure relief functions. The valve is basically designed as a double-acting or duplex valve so that, starting right with the construction, the prerequisite for providing two valve functions exists. Here one side of the valve can selectively be quasi-stopped by replacing the valve element that can be controlled separately with a closing element. By replacing the valve core and/or the valve element, the pressure relief functions can be influenced within wide limits on one side or also on both sides, and it is especially advantageous that the valve core can be made with a very simple geometric shape.

Preferably the valve core is made so that an individually adjustable pressure system can be allocated to each valve side. Thus, flexibility with respect to suitability and operational possibilities is additionally obtained. In this way, by separate control of the valve elements, two different pressure functions can be provided at the valve outlets. To vary the pressure functions or the output pressures, it is necessary only either to replace the valve core with another or to exchange the flow-changing components, such as, e.g., a valve seat core, the valve element or additional restrictors, on the various sides of the valve core. The last-mentioned possibility is one object of the present invention, and thus the special advantage of a simple and reliable disconnection of both valve sides from one another can be achieved.

The standard valve housing being used according to the present invention makes it possible, with simple machining and in an advantageous way, to use the side faces that are vertical on the valve axis to flange-mount adjusting devices for the associated pressure relief valve. This design is especially advantageous when, as the adjusting device, a proportional magnet is used that generates, as a function of an electrical input signal at an adjusting tappet that acts on the valve element, an adjusting force proportional to it. But it should be emphasized that also action on the valve pistons by other operating elements, while incorporating hydraulic control, is possible, although in this case, too, the side faces are used as the interface for the adjusting devices or operating elements.

Preferably the connections of the pressure relief valve are all made on one side of the standard distributing valve housing, so that only a single coupling interface area is needed to expand a hydraulic control block by two pressure relief valves that become operative independently of one another. The individual adjustment of the pressure systems on each valve side is made possible in the simplest manner by a further embodiment of the present invention. Here the additional advantage results that, to vary the pressure functions or to assemble a pressure control valve system with new pressure functions, only restrictors that can be produced in large quantities, and thus economically, need be exchanged. Here of course the receiving bores for the exchangeable restrictors are calibrated so that standard restrictor dimensions are directly compatible.

When the valve seats according to a further embodiment also consist of exchangeable components, other possibilities for varying the pressure functions, i.e., for adjusting the maximum output pressure, result. The latter can be varied within wide limits.

Further advantageous configurations are also the object of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
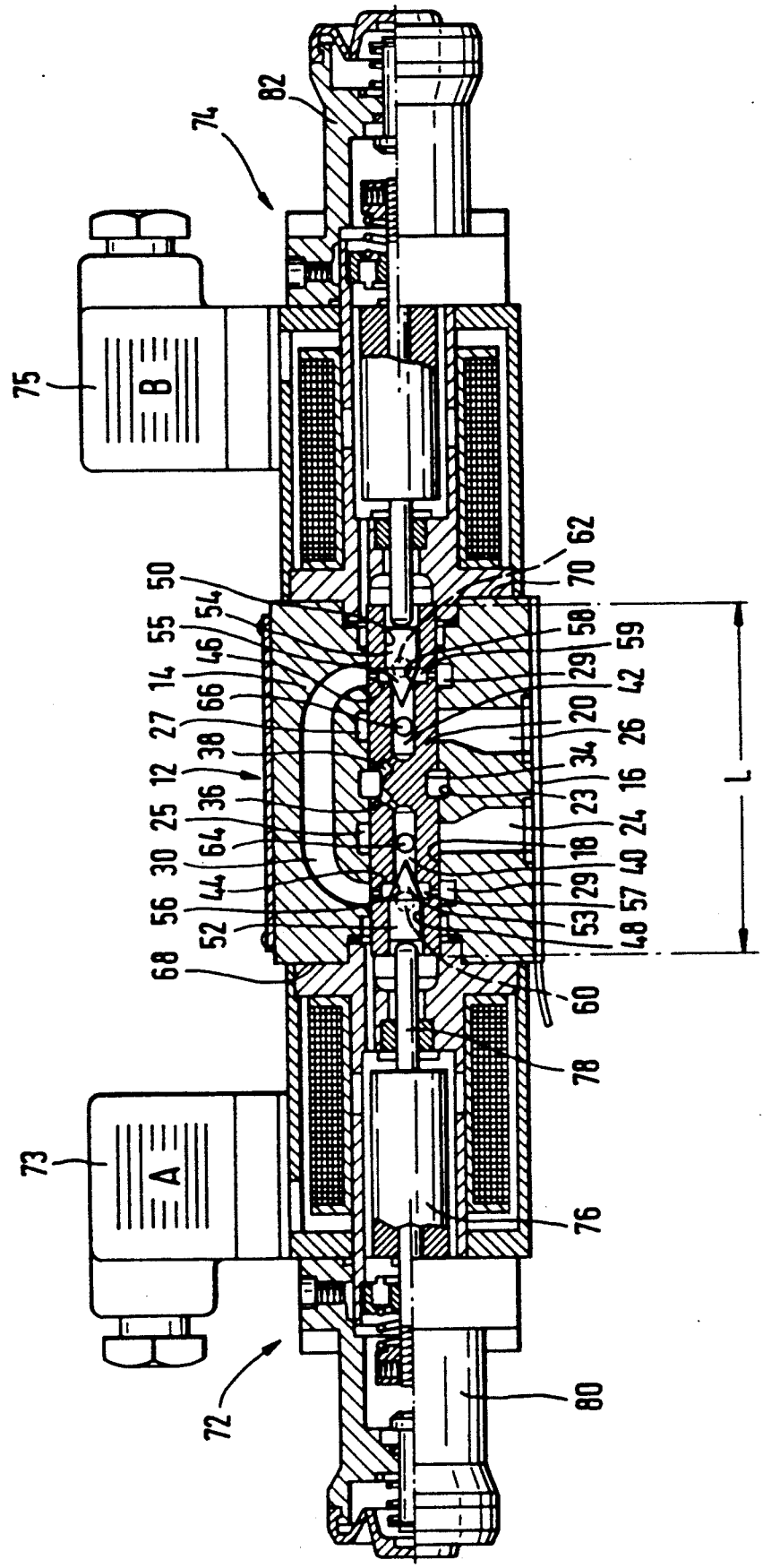
FIG. 1 is a lengthwise sectional view of the pressure relief valve made as a double-acting or duplex valve according to a first embodiment.
Figure 6:
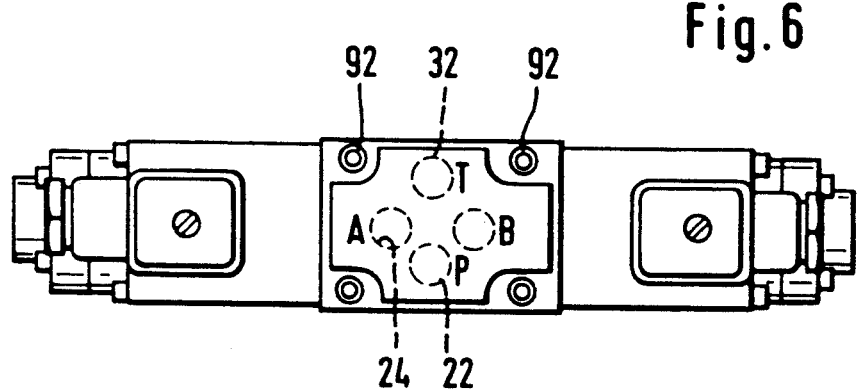
FIG. 6 is a view taken in the direction of arrow VI in FIG. 5.
Figure 7:
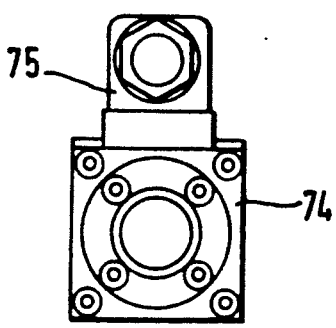
FIG. 7 is a view taken in the direction of arrow VII in FIG. 5.

In FIG. 1, reference member 12 designates a pressure relief valve made as a double-acting or duplex valve with which two pressure relief functions independent of each other can be achieved and that further can be changed within wide limits or can be partially switched off. As a carrier element, a standard distributing valve housing 14 with four connections, namely a system pressure connection P, a low pressure or tank connection T and two other connections A and B, is used. Housing 14 is preferably made as a cast part, and connections P, A and B as well as a low pressure or tank connection T, as can be seen in FIG. 6, are all placed on one side, namely in the area of a bottom coupling area. Connection ducts 22, 24 and 26 for connections P, A and B are connected to annular spaces 23, 25 and 27, and annular spaces 25 or 27 allocated to connections A and B are located on both sides of annular space 23. Annular spaces 29, outside and on one side, are connected to one another by a connection duct 30 that is incorporated in housing 14 and that is connected to tank T by a connection duct 32 through which a flow medium can pass.

A sleeve-shaped valve core 20 which, with its cylindrical wall, separates adjacent annular spaces 23, 25, 27 and 29 from one another, is accommodated in a through bore 18 that is used in a standard distributing valve to accommodate the valve piston. Valve core 20 has the shape of a cylinder that has, essentially in the center and consequently, in the installed condition, in the area of annular space 23, an annular groove 34 from which juncture bores 36, 38 run, slanted inwardly each to a central axial bore 40, 42. Axial bores 40, 42 merge over a step into a guide section 48, 50 to receive, in a positively-locking manner, a cylindrical valve element 52, 54 that has in each case a conical valve block 53 or 55 that interacts with a valve seat 56 or 58. In the embodiment shown, valve seat 56, 58 is formed by step 44, 46. In the area of guide section 48, 50, in front of valve seat 56, 58, there is located an annular space 57, 59 that is connected by at least one radial bore 60, 62 to connection duct 30 leading to the tank or low pressure connection T.

In each case at least one radial bore 64, 66 originates at axial bore 40, 42 in the area of annular space 25, 27 allocated to connections A, B, producing a connection to connections A or B.

Separate, and in particular individually adjustable, pressure systems result on both sides of annular groove 34 by juncture bores 36, 38, which are preferably equipped with restrictors, enabling adjustment of the respective pressure functions as follows:

Proportional magnets 72, 74 that are controlled by a plug-in connector 73, 75 with electrical signals and are flange-mounted in each case on both side faces 68, 70. An adjusting tappet 78 connected to magnet armature 76 applies, to valve element 52 or 54 in question, a force that is proportional to the input signal and that thus determines the pressure value at which valve block 53, 55 lifts off valve seat 56, 58, limiting the maximum pressure in connections A and B. The special feature of controlling by proportional magnets 72, 74 consists here of the feature that, independently of the opening stroke of valve element 52, 54 in question, the adjusted magnetic force and thus the counterforce to the valve element are kept constant, by which, with increasing flow, pressure increases can be precluded to the greatest possible extent.

A reduction of the magnetic force leads to an excess of compressive force in the area of axial bore 40 or 42. Valve element 52, 54 with its conical valve block 53, 55 is accordingly moved away from the valve seat, so that control oil can drain off and the pressure accordingly decreases. After reaching an equilibrium of forces, the pressure is again kept constant, but now at a lower level.

At currentless proportional magnets 72, 74, connections A and B to connection T are opened, so that hydraulic flow medium can drain off unimpeded to the tank. The pressure in A and B corresponds to the tank pressure.

References 80 and 82 indicate emergency operations of the valve, to provide a predetermined pressure relief function in case of power failure.

Figure 2:
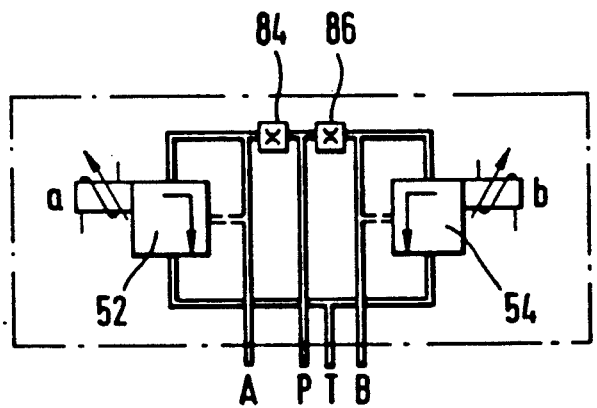
FIG. 2 is a block diagram of the valve according to FIG. 1.

From the description above it becomes clear that the design of pressure relief valve 12 is selected so that, with simple means and with easily producible components, the pressure relief valve can be modified to provide the most varied pressure functions. This is performed by restrictors 84, 86 (see FIG. 2), not shown in greater detail, and placed in juncture bores 36, 38 by individual adaptation and/or control of valve elements 52, 54 by the input signals of associated proportional magnets 72, 74. According to a first variant of the valve assemblies, as is shown in FIG. 2, a double-acting relief valve thus results with two pressure systems independent of one another because of restrictors 84, 86 for separate adjustment of the maximum pressures in connections A and B. The ratio of the maximum pressures in connections A and B can be changed within wide limits by exchanging valve elements 52, 54 and valve seats 56, 58, thus resulting in a wide range of variation with respect to the maximum output pressure in connections A and B.

Figure 3:
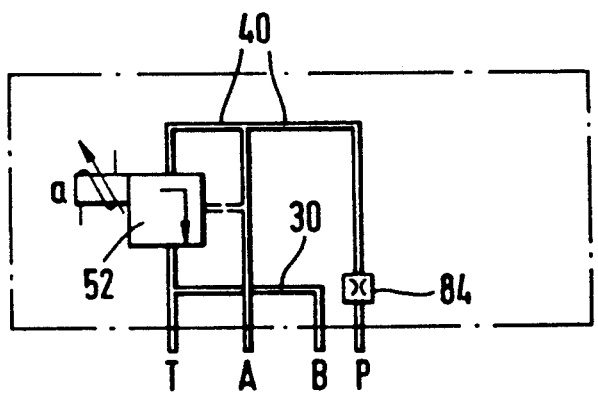
FIGS. 3 and 4 are block diagrams of the pressure relief valve according to FIG. 1 for the case in which switching-off of the adjustable pressure system is performed on one side in each case.
Figure 4:
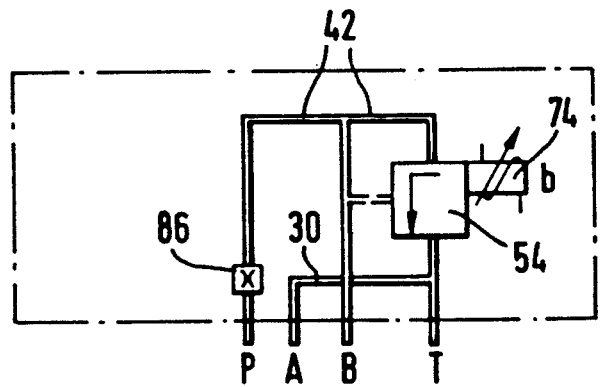

As can be seen in FIG. 1, valve core 20 is made so as to have a length L that is not larger than the length of valve housing 14. This facilitates the selective modification of the pressure relief valve so that the pressure relief function can be completely switched off on one side. The associated block diagrams are shown in FIGS. 3 and 4. Here system pressure connection P is connected by restrictor 84 to axial bore 40, which can be blocked by valve element 52. On the other side of the pressure relief valve, juncture bore 38 is blocked and valve element 54, as well as proportional magnet 74, is removed. Instead of this, the right side face 70 according to FIGS. 1 and 5 can be closed by a cover, with the result being that, by connection duct 30 and radial bores 62, connection B also is connected by radial bore 66 to the tank. The same applies to the modification of the pressure relief valve into the arrangement according to FIG. 4. Here the pressure system of the left side according to FIG. 1 is removed, so that only a restrictor 86 is still provided facing axial bore 42. Correspondingly, valve element 52 is removed and only valve element 54 is still present, which is controlled by proportional magnet 74. Instead of proportional magnet 72 there is a cover 90 that is indicated in FIG. 5 with dot-dashed lines.

Figure 5:
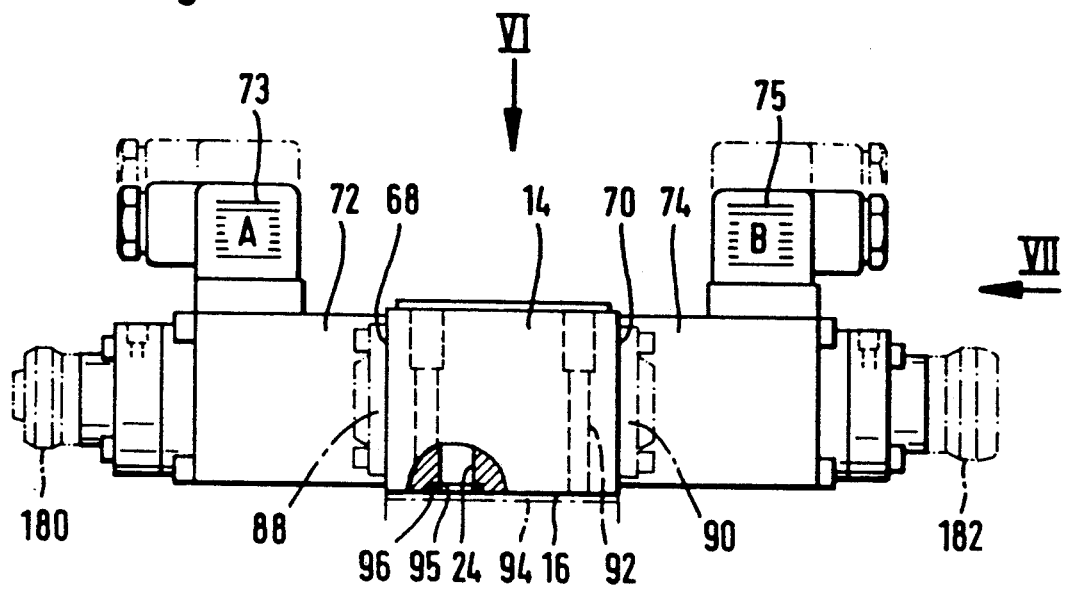
FIG. 5, on a different scale, is a side view of the proportional pressure relief valve according to FIG. 1, partially cut away to show the position of the pressure connections.

Also indicated with dot-dashed lines in FIG. 5 are emergency operating elements 180 or 182, with which duplex pressure relief valve 12 can additionally be equipped, in the usual way or can be covered (as indicated by reference number 182).

Reference number 92 designates stepped bores that are used for receiving tensioning bolts by which duplex valve 12 can be tensioned, for example by inserting a suitable seal 94, by bottom coupling area 16 against a hydraulic control block, not shown in greater detail. Stepped bores 92 are each placed in the corner areas of standard distributing valve housing 14, so that the diameter of valve core 20 can be made relatively large. Connections A, B, T and P all empty into bottom-side coupling or flange-mounting area 16. The connection ducts for these connections preferably comprise a countersink 95, which can contain a seal 96.

Figure 8:
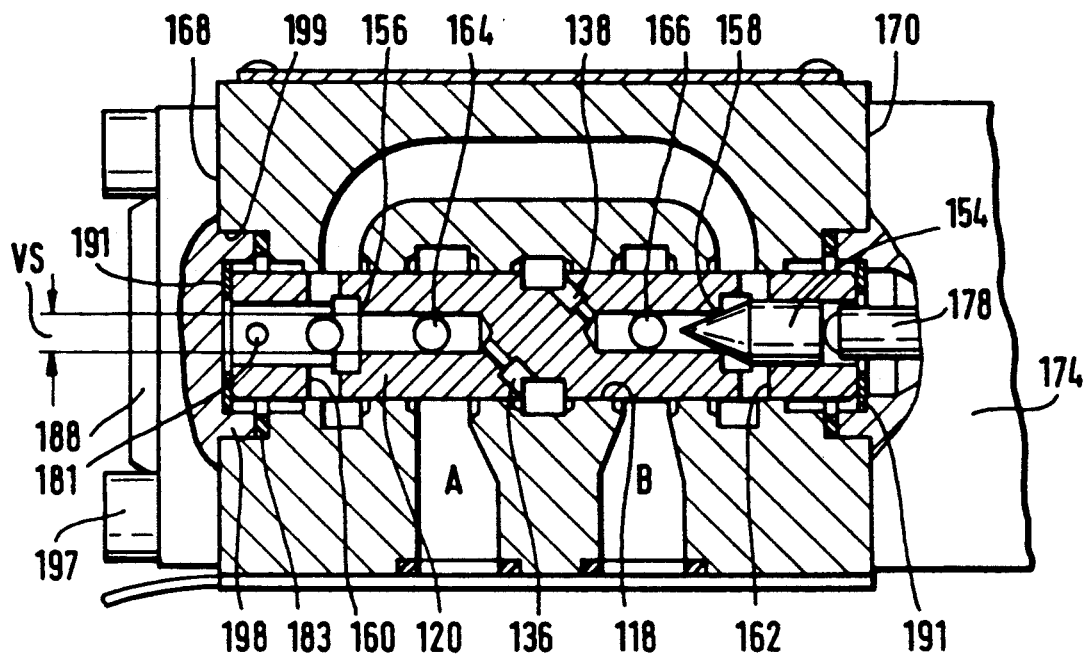
FIG. 8, on an enlarged scale, is a lengthwise sectional view of the standard distributing valve housing of the pressure relief valve according to a further embodiment.

FIG. 8 shows a somewhat modified embodiment of the pressure relief valve that corresponds to the block diagram according to FIG. 4. Those components that correspond to the parts of the above-described embodiment are designated by similar references, but they are preceded by a "1". Sleeve-shaped valve core 120, which in this embodiment is equipped only on one side with a valve element 154, is contained in through bore 118. On the other side, on side face 168, there is placed a closing cover 188 that is attached by fastening screws 197. Cover 188 has a hollow cylindrical extension 198 that engages in a recess 199 of side face 168 and interacts with a seal 183 on the face. The same recess 199 is used on the other side of the valve for the centered attachment of the housing of proportional magnets 174.

The slanted puncture bores designated by 136 and 138 are offset peripherally to one another by 180° and are made in a stepped fashion, so as to be able to receive restrictors of varied caliber.

Axial positioning of valve core 120 is performed by shims 191 that are braced, on the one hand, on cover 188 and, on the other hand, on a shoulder of the proportional magnet housing.

Reference number 181 designates another radial bore that is connected to tank connection T so that the magnetic space behind valve element 154 can be relieved of pressure.

Figure 9:
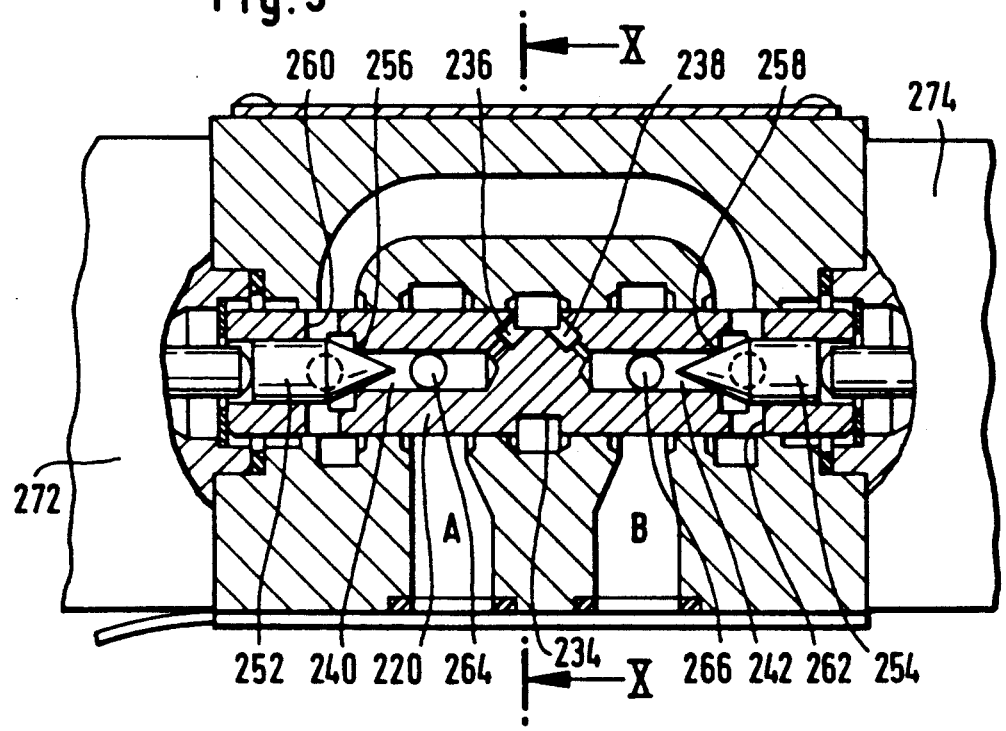
FIG. 9 is a view similar to that of FIG. 8 of a further embodiment of the pressure relief valve.

The embodiment according to FIG. 9 differs from those according to FIG. 8 with respect to two points. On the one hand, the pressure relief valve is equipped with two pressure systems that can be controlled independently of one another and consequently with two adjusting devices in the form of proportional magnets. The second difference is that slanted juncture bores 236, 238 extend from annular groove 234 axially aligned. Otherwise the bores are made identical to those in the above-described embodiments, again so to be able to receive exchangeable restrictors so that the volumetric rate of flow of the control oil can be separately influenced on its own on each side.

Figure 10:
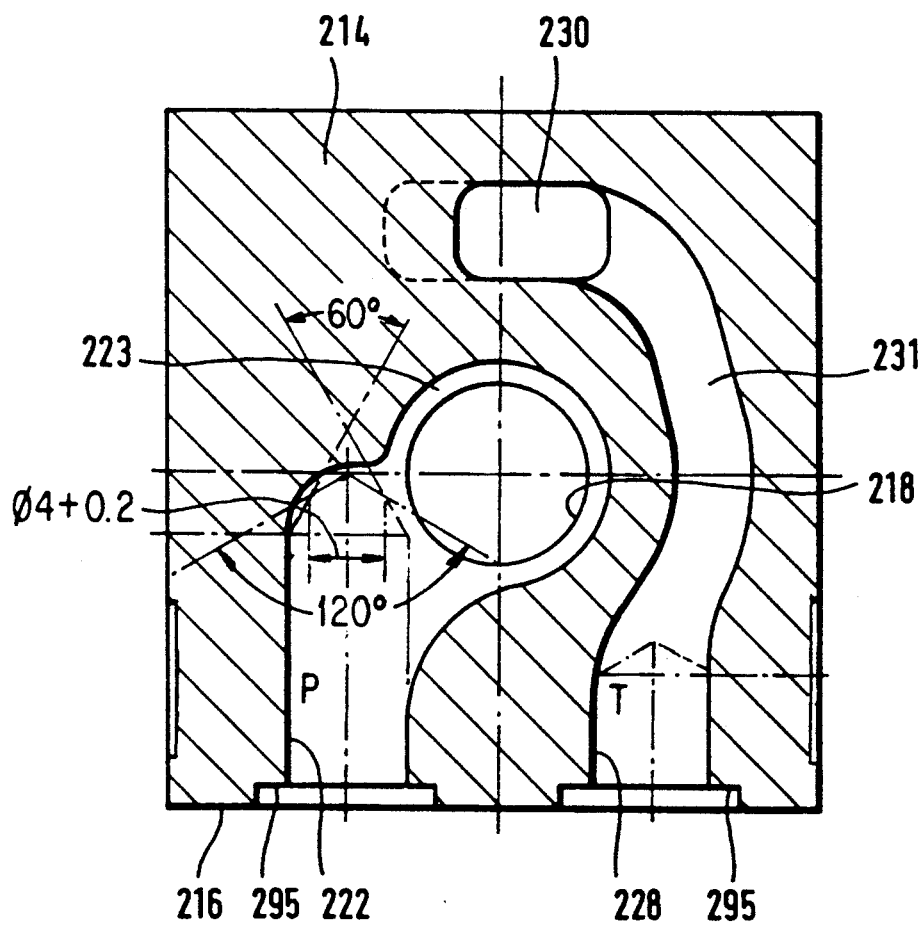
FIG. 10 is a view taken along line X—X in FIG. 9 through the standard distributing valve housing with the valve core removed.

Finally, FIG. 10 shows how tank end and system pressure end T or P are placed in standard distributing valve housing 214 so that the connection ducts of all connections can empty into bottom-side assembly area 216. It can be seen in FIG. 6 that connection ducts 24 and 26 for connections A and B lie in an axial plane of the pressure relief valve and connection ducts 22 and 28 for connections P or T lie in a plane that is perpendicular to it and that forms the plane of projection according to FIG. 10. Connection duct 222 merges on the inside with annular space recess 223. Connection duct 228 is connected to connection duct 230 by a curved intermediate section 231 that spans through bore 218.

Although the embodiments shown show the standard distributing valve housing in the embodiment in which the valve connections each empty into annular spaces that surround the piston through bore, the invention of course is not limited to this embodiment. It is equally possible to design the connection bores as blind bores connected to allow passage of a flow medium to corresponding, encircling recesses made in the valve core.

The invention thus provides a pressure relief system with a design that makes it possible to provide numerous different pressure relief functions with a minimum of structural changes. For this purpose, a standard distributing valve housing is equipped with a valve core that makes it possible to construct a duplex pressure relief valve with an individually adjustable pressure system on each valve side, also making it possible, on the other hand, to completely shut off the pressure system on one side. The valve core and/or the valve elements are preferably exchangeable, and the valve elements can be controlled separately by an adjusting device, for example in the form of a proportional magnet, to generate a pressure output signal corresponding to an input signal in each of the pressure systems independently of one another.

Also conceivable is the additional passing through of connections P, A, B and T to the top side of the valve housing, thus resulting in a valve that can be installed between other valves. This represents an interim solution. The way in which it functions corresponds to the already-described valve.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An adjustable pressure relief valve for generating a pressure output signal corresponding to one of an input valve and a signal in a valve connection, wherein the pressure relief valve comprises:

a duplex valve which includes a distributing valve housing of a standard way-valve design equipped with not greater than four connections, said housing having a piston bore wherein an exchangeable valve core is positioned in said bore, said valve core being equipped on opposite sides thereof with a separately controllable seat valve element and which is selectively closable on one side thereof against the pressure in said first and second output connections wherein individually adjustable pressure systems are connected to each of said opposite sides of said valve and wherein said valve core comprises a sleeve-shaped element which comprises on an inside portion thereof two valve seats that are connected by separate control oil ducts to a central pressure connection area.

2. A pressure relief valve according to claim 1, wherein said control oil ducts each include a restrictor.

3. A pressure relief valve according to claim 2, wherein said valve elements comprise a conically pointed piston guided in said valve core and which comprises means for generating a constantly adjustable exterior control force on said conically pointed position.

4. A pressure relief valve according to claim 2, which comprises a proportional magnet which acts on at least one of said valve elements wherein said magnet is housed on a side face of said distributing valve housing.

5. A pressure relief valve according to claim 2, wherein said connections of said pressure relief valve are all positioned on one side of said distributing valve housing so as to form a coupling with a hydraulic control block.

6. A pressure relief valve according to claim 2, wherein said valve core comprises, for connection to control oil ducts, at a central pressure connection area, an annular groove at which separate juncture bores originate for forming a connection in each case to an axial bore of said valve core which leads to an associated valve seat of said valve seats.

7. A pressure relief valve according to claim 2, which comprises valve seats which lie in the area of a step of said bore and wherein a section of said bore with a larger diameter is connected in the area of said valve seats by at least radial bore to a pressure relief duct.

8. A pressure relief valve according to claim 1, wherein said valve elements comprise a conically pointed piston guided in said valve core and which comprises means for generating a constantly adjustable exterior control force on said conically pointed piston.

9. A pressure relief valve according to claim 8, which comprises a proportional magnet which acts on at least one of said valve elements wherein said magnet is housed on a side face of said distributing valve housing.

10. A pressure relief valve according to claim 8, wherein said connections of said pressure relief valve are all positioned on one side of said distributing valve housing so as to form a coupling with a hydraulic control block.

11. A pressure relief valve according to claim 8, wherein said valve core comprises, for connection to control oil ducts, at a central pressure connection area, an annular groove at which separate juncture bores originate for forming a connection in each case to an axial bore of said valve core which leads to an associated valve seat of said valve seats.

12. A pressure relief valve according to claim 8, which comprises valve seats which lie in the area of a step of said bore and wherein a section of said bore with a larger diameter is connected in the area of said valve seats by at least radial bore to a pressure relief duct.

13. A pressure relief valve according to claim 1, which comprises a proportional magnet which acts on at least one of said valve elements wherein said magnet is housed on a side face of said distributing valve housing.

14. A pressure relief valve according to claim 13, wherein said side face has a centering fixture for the housing of one of a proportional magnet and a centering extension of a closing cover.

15. A pressure relief valve according to claim 13, wherein said connections of said pressure relief are all positioned on one side of said distributing valve housing so as to form a coupling with a hydraulic control block.

16. A pressure relief valve according to claim 13, wherein said valve core comprises, for connection to control oil ducts, at a central pressure connection area, an annular groove at which separate juncture bores originate for forming a connection in each case to an axial bore of said valve core which leads to an associated valve seat of said valve seats.

17. A pressure relief valve according to claim 13, which comprises valve seats which lie in the area of a step of said bore and wherein a section of said bore with a larger diameter is connected in the area of said valve seats by at least radial bore to a pressure relief duct.

18. A pressure relief valve according to claim 1, wherein said connections of said pressure relief valve are all positioned on one side of said distributing valve housing so as to form a coupling with a hydraulic control block.

19. A pressure relief valve according to claim 18, wherein said valve core comprises, for connection to control oil ducts, at a central pressure connection area, an annular groove at which separate juncture bores originate for forming a connection in each case to an axial bore of said valve core which leads to an associated valve seat of said valve seats.

20. A pressure relief valve according to claim 18, which comprises valve seats which lie in the area of a step of said bore and wherein a section of said bore with a larger diameter is connected in the area of said valve seats by at least radial bore to a pressure relief duct.

21. A pressure relief valve according to claim 18, wherein said side face has a centering fixture for the housing of one of a proportional magnet and a centering extension of a closing cover.

22. A pressure relief valve according to one of claim 1, wherein said valve core comprises, for connection to control oil ducts, at a central pressure connection area, an annular groove at which separate juncture bores originate for forming a connection in each case to an axial bore of said valve core which leads to an associated valve seat of said valve seats.

23. A pressure relief valve according to claim 22, wherein said valve core comprises juncture bores within which exchangeable restrictors are positioned.

24. A pressure relief valve according to claim 22, wherein said valve core includes juncture bores formed therein which are offset with respect to one another in a peripheral direction.

25. A pressure relief valve according to claim 24, wherein said valve core includes at least one radial bore which originates from an axial bore formed in said valve core wherein said radial bore is connected to an associated output connection for allowing passage of a flow medium.

26. A pressure relief valve according to claim 24, which comprises valve seats which lie in the area of a step of said bore and wherein a section of said bore with a larger diameter is connected in the area of said valve seats by at least radial bore to a pressure relief duct.

27. A pressure relief valve according to claim 24, wherein said side face has a centering fixture for the housing of one of a proportional magnet and a centering extension of a closing cover.

28. A pressure relief valve according to claim 22, wherein said valve core includes at least one radial bore which originates from an axial bore formed in said valve core wherein said radial bore is connected to an associated output connection for allowing passage of a flow medium.

29. A pressure relief valve according to claim 28, which comprises valve seats which lie in the area of a step of said bore and wherein a section of said bore with a larger diameter is connected in the area of said valve seats by at least radial bore to a pressure relief duct.

30. A pressure relief valve according to claim 28, wherein said side face has a centering fixture for the housing of one of a proportional magnet and a centering extension of a closing cover.

31. A pressure relief valve according to claim 22, which comprises valve seats which lie in the area of a step of said bore and wherein a section of said bore with a larger diameter is connected in the area of said valve seats by at least radial bore to a pressure relief duct.

32. A pressure relief valve according to claim 22, wherein said side face has a centering fixture for the housing of one of a proportional magnet and a centering extension of a closing cover.

33. A pressure relief valve according to claim 1, which comprises valve seats which lie in the area of a step of said bore and wherein a section of said bore with a larger diameter is connected in the area of said valve seats by at least radial bore to a pressure relief duct.

34. A pressure relief valve according to claim 33, wherein said side face has a centering fixture for the housing of one of a proportional magnet and a centering extension of a closing cover.

* * * * *

UNITED STATES PATENT AND TRADEMARK OFFICE
CERTIFICATE OF CORRECTION

PATENT NO. : 5,291,915
DATED : MARCH 8, 1994
INVENTOR(S) : Wolfgang LUKASCZYK ET AL It is certified that error appears in the above-indentified patent and that said Letters Patent is hereby corrected as shown below:

Column 3, line 8, delete "," and insert --;--.

Signed and Sealed this

Thirty-first Day of October 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,291,915

DATED : March 8, 1994

INVENTOR(S) : Wolfgang Lukasczyk et al.

It is certified that error appears in the above-identified patent and that said Letters Patent is hereby corrected as shown below:

Column 7, line 15, delete "position" and insert --piston--.

Signed and Sealed this

Nineteenth Day of December, 1995

Attest:

BRUCE LEHMAN

Attesting Officer

Commissioner of Patents and Trademarks